United States Patent
Shimonaga

(10) Patent No.: US 6,466,659 B1
(45) Date of Patent: *Oct. 15, 2002

(54) FACSIMILE COMMUNICATION APPARATUS HAVING SINGLE MEMORY FOR VOICE AND IMAGE DATA

(75) Inventor: Sadaaki Shimonaga, Nara (JP)

(73) Assignee: Sharp Kabushiki, Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 07/896,738

(22) Filed: Jun. 9, 1992

Related U.S. Application Data

(63) Continuation of application No. 07/568,408, filed on Aug. 16, 1990.

(30) Foreign Application Priority Data

Aug. 17, 1989 (JP) .............................. 1-212164
Aug. 17, 1989 (JP) .............................. 1-212165
Aug. 17, 1989 (JP) .............................. 1-212166

(51) Int. Cl.⁷ .............................................. H04M 11/00
(52) U.S. Cl. ............................ 379/100.01; 379/100.16; 358/444
(58) Field of Search .......................... 379/100, 88, 89, 379/100.01, 100.15, 100.16, 88.13, 88.28, 100.17; 358/434, 435, 438, 439, 443, 444

(56) References Cited

U.S. PATENT DOCUMENTS

| | | | | |
|---|---|---|---|---|
| 4,086,443 A | * | 4/1978 | Gorham et al. | 358/435 |
| 4,121,058 A | * | 10/1978 | Jusko et al. | 381/32 |
| 4,523,055 A | * | 6/1985 | Hohl et al. | 379/89 |
| 4,528,689 A | * | 7/1985 | Katz | 381/31 |
| 4,910,780 A | * | 3/1990 | Miki | 381/32 |
| 4,922,524 A | * | 5/1990 | Baba et al. | 358/435 |
| 4,989,232 A | * | 1/1991 | Tsumura | 379/88 |
| 5,014,296 A | * | 5/1991 | Saigano | 379/88 |
| 5,018,186 A | * | 5/1991 | Kimura et al. | 379/53 |
| 5,072,309 A | * | 12/1991 | Browh | 379/100 |

FOREIGN PATENT DOCUMENTS

| | | | | |
|---|---|---|---|---|
| EP | 0 201 772 | | 11/1986 | |
| EP | 0 204 626 | | 12/1986 | |
| EP | 0 338 812 | | 10/1989 | |
| JP | 0030352 | * | 2/1984 | 379/100 |
| JP | 62-85555 | | 4/1987 | |
| JP | 64-17554 | | 1/1989 | |
| JP | 64-46368 | | 2/1989 | |
| JP | 64-71260 | | 3/1989 | |
| JP | 01-177251 | | 7/1989 | |
| JP | 1 146453 | | 9/1989 | |
| JP | 1-191560 | | 11/1989 | |
| JP | 0081556 | * | 3/1990 | 379/100 |

OTHER PUBLICATIONS

Andrew S. Tanenbaum, Structured Computer Organization 326 (2d ed. 1984).*

* cited by examiner

Primary Examiner—Stella Woo
(74) Attorney, Agent, or Firm—Edwards & Angell, LLP; David G. Conlin; William J. Daley, Jr.

(57) ABSTRACT

In the existing facsimile apparatuses with telephone function, those having the function of storing the received acoustic signal when the subscriber is absent are known. Hitherto, modulation/demodulation and memory of image data and acoustic data have been executed in independent compositions, and the structure was large and complicated. Besides, various pieces of voice information sent out upon arrival of acoustic signals were also processed in independent compositions, and versatile use was difficult. In the invention, the acoustic data is processed by using image data processing apparatus, and acoustic data is stored in image memory. Moreover, when storing image data and acoustic data in image memory, each memory region is set dynamically. Further, the voice data sent out upon arrival is stored in part of the program memory controlled by the CPU. As a result, the structure is reduced in size and simplified, and complicated combined processing of voice signal being sent out may be realized.

7 Claims, 8 Drawing Sheets

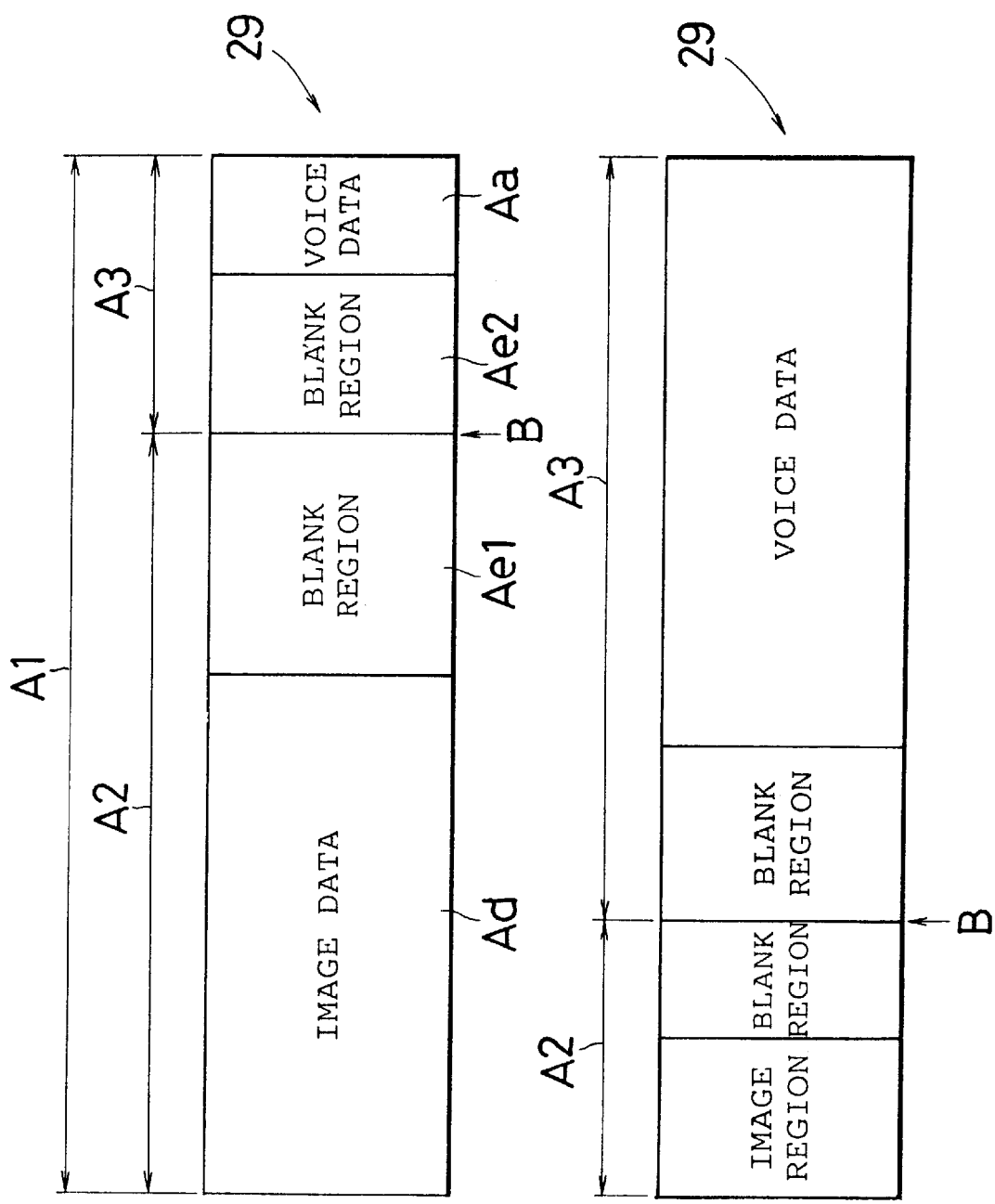
Fig. 4 (1)
Fig. 4 (2)

Fig. 5 (1)
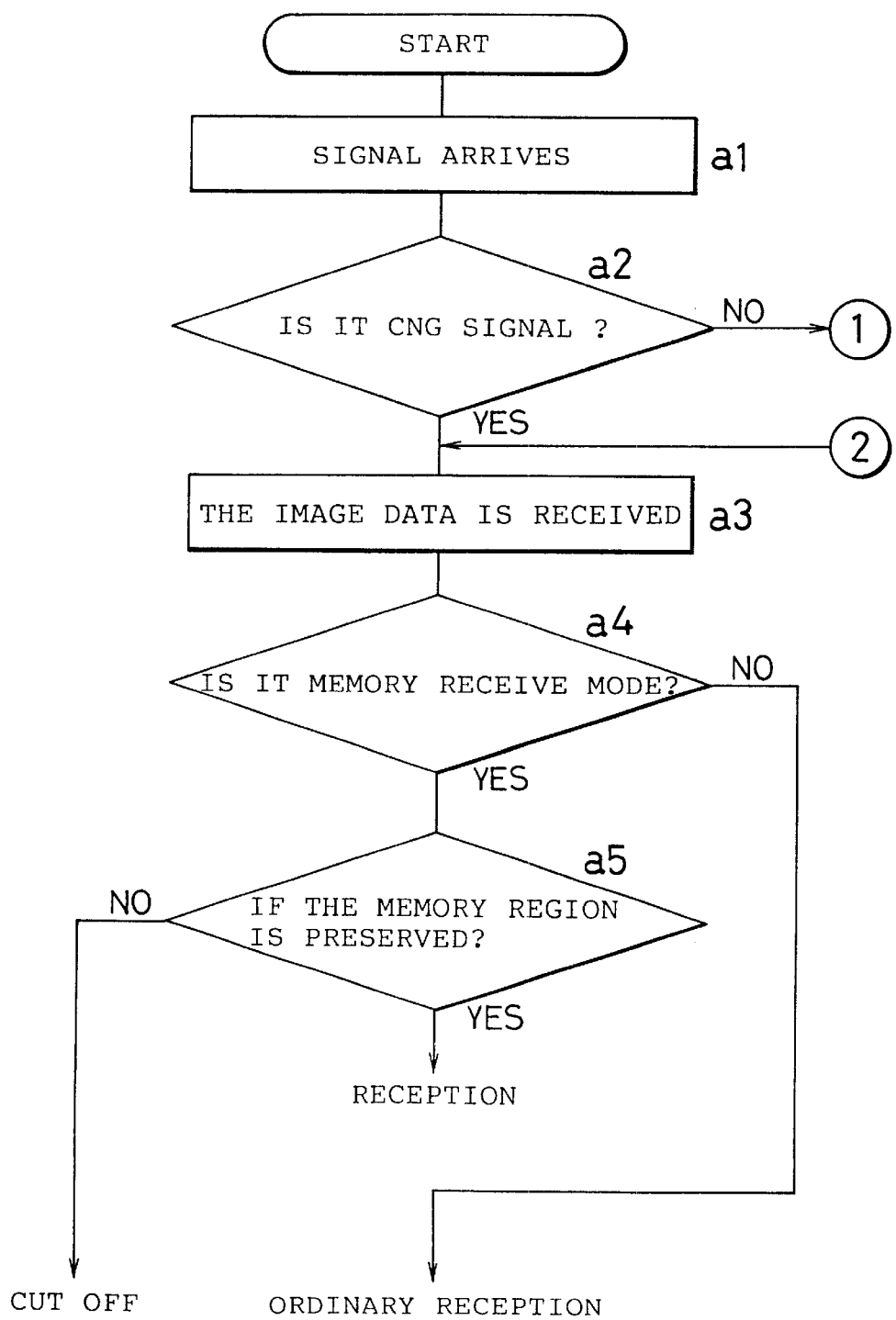

Fig. 5 (2)
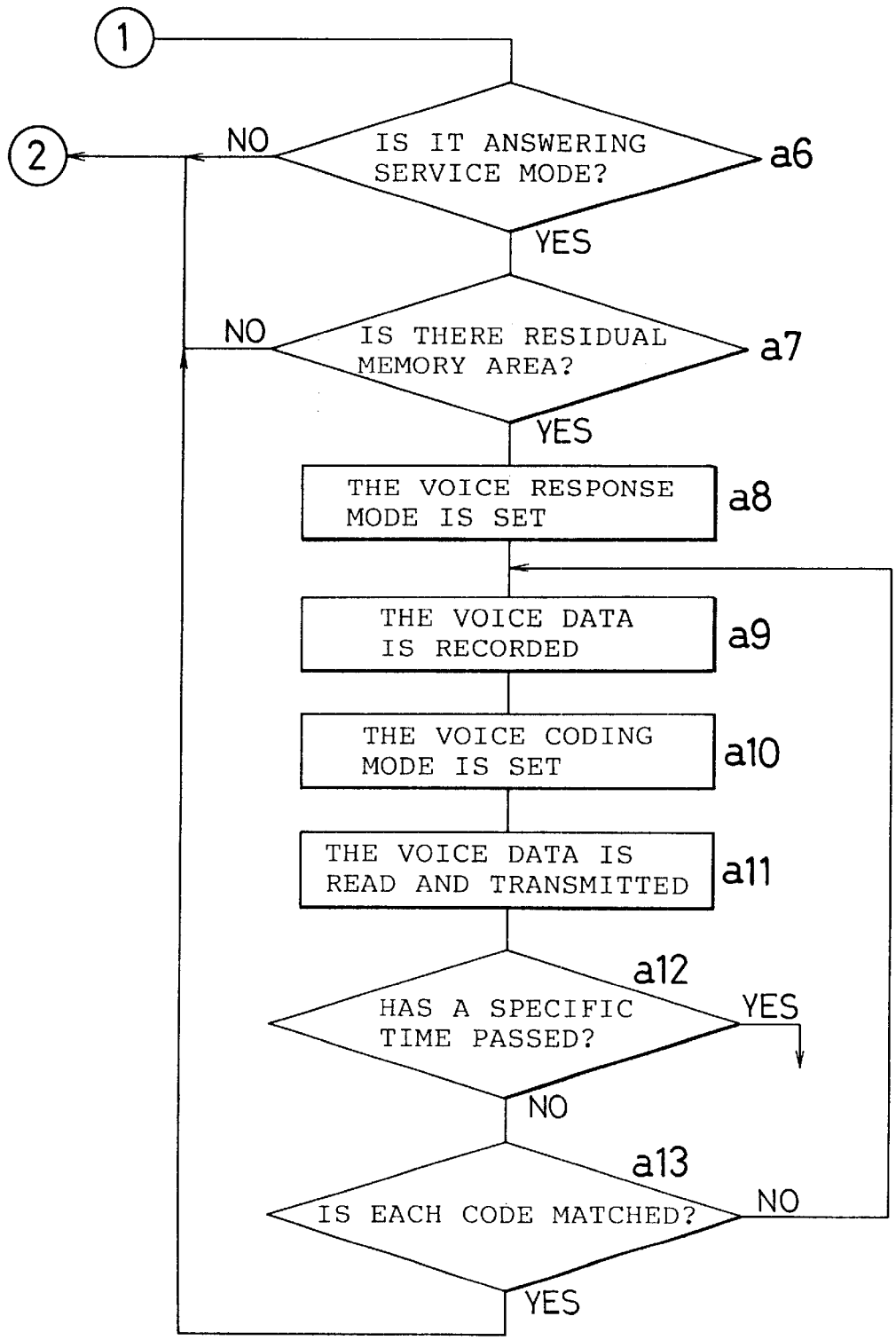

FACSIMILE COMMUNICATION APPARATUS HAVING SINGLE MEMORY FOR VOICE AND IMAGE DATA

"This is a continuation of copending application Ser. No. 07/568,408 filed on Aug. 16, 1990".

BACKGROUND OF THE INVENTION

1. Field of the Invention

This present invention relates to a facsimile communication apparatus.

2. Prior Art

FIG. 1 is a block diagram showing a structure of a typical conventional facsimile communication apparatus (hereinafter called facsimile apparatus) 1. Referring to FIG. 1, the facsimile apparatus 1 comprises a circuit control member 3 responsible for operation relating to the connection and disconnection of a circuit with a telephone circuit network 2, and a telephone set 4 connected to the circuit control member 3.

The circuit control member 3 is connected, through a changeover switch 5, to a modulation/demodulation circuit (hereinafter called modem) 6 for modulating and demodulating the image data, and a voice data processing circuit 7 for coding or decoding voice data, and the modem 6 is connected to a control circuit 8 for controlling the entire action of the facsimile apparatus 1. The voice data processing circuit 7 is connected to a voice memory 9 composed of random access memory (RAM) for storing the voice data and other data as described below.

The control circuit 8 changes over the changeover switch 5 to the modem 6 when the facsimile apparatus 1 is transmitting image data through the telephone circuit network 2, and sends or receives the image data. On the other hand, even though the facsimile apparatus 1 is connected with other facsimile apparatus through the telephone circuit, a predetermined voice output such as "Enter code number" may be effected from the facsimile apparatus 1, or voice data may be received and stored. When carrying out a predetermined action in the facsimile apparatus 1 with respect to data from another facsimile apparatus, following to the establishment of a circuit connection with the so called side facsimile apparatus, the input of a predetermined code number is required or the function of the so-called answering service is known. The control circuit 8 of the facsimile apparatus 1 calls the predetermined voice output from the voice memory 9, when the present state of action requires the input of a code number or the storage of voice data at the moment of confirmation of the establishment of circuit connection with other facsimile apparatus by the circuit control member 3, and obtains the coded voice data from the voice data processing circuit 7, and sends it through the circuit control member 3. The received voice data is stored in the voice memory 9.

In such conventional facsimile apparatus 1, when storing the voice data as mentioned above, an exclusive voice memory 9 as shown in FIG. 1 is required, and the number of parts increases such as the analog/digital converter and digital/analog converter for voice data, and the overall system becomes larger in size. Further, the control by the control circuit 8 of the voice memory 9 is effected through the voice data processing circuit 7, and when plural types of voice data are stored in the voice memory 9 and the system attempts to reproduce them continuously in a predetermined combination, the control becomes much too complicated.

Further, the voice memory 9 is by far smaller in its memory capacity as compared with the image data memory installed in the modem 6, for example, and it cannot satisfy the need of storing a large quantity of acoustic data.

SUMMARY OF THE INVENTION

It is hence a primary object of the invention to solve the above technical problems, and present a facsimile communication apparatus simplified in construction, reduced in size, and enhanced in its use.

The invention presents a facsimile communication apparatus comprising:

modulation/demodulation means for sending and receiving image data by using a telephone circuit, such means being composed of signal converting means for converting an analog signal from the telephone circuit into a digital signal and signal controlling means for coding or decoding a digital signal entering or leaving of the signal converting means, and memory means for storing the acoustic data together with the image data being sent and received, wherein the memory content in the memory means is modulated or demodulated by the modulation/demodulation means, and sent to the telephone circuit or received in the telephone circuit.

The invention also presents a facsimile communication apparatus comprising:

modulation/demodulation means for sending and receiving image data by using a telephone circuit, memory means for storing the image data, being installed in the modulation/demodulation means, and memory control means for varying the image data memory region and acoustic data memory region corresponding to the quantity of data being stored, when storing at least one of the corresponding image data and acoustic data by setting the image data memory region and acoustic data memory region in the memory means.

The invention further relates to a facsimile communication apparatus wherein a blank region is set in a range of memory means closer to the image data memory region of acoustic data memory region or image data memory region of acoustic data memory region.

The invention, moreover, presents a facsimile communication apparatus having modulation/demodulation means for sending and receiving image data by using a telephone circuit, and transmitting acoustic data by using the modulation/demodulation means, also comprising:

central control means, and program memory means for storing the program for defining the control action of the central control means, wherein an acoustic data memory region is set in the program memory means and acoustic data is stored, and the central control means detects that the predetermined acoustic data generation condition is established, reads out the acoustic data from the program memory means, and transfers the acoustic data to the modulation/demodulation means for modulation and transmission.

In the facsimile communication apparatus according to the invention, the analog signal from the telephone circuit is converted into a digital signal by the signal converting means of the modulation/demodulation means whether image data or acoustic data, and is decoded by the signal control means and stored in the memory means. The image data and acoustic data stored in the memory means are, when being transmitted to the telephone circuit, coded by the signal control means of the modulation/demodulation means, and then converted into analog signals by the signal converting means to be sent out to the telephone circuit.

Thus, when sending or receiving acoustic data in the facsimile communication apparatus, digital/analog conversion or analog/digital conversion is effected by using the modulation/demodulation means for processing the acoustic data, and the acoustic data is coded or decoded by using the signal control means. As a result, memory means, coding/decoding means and signal converting means used exclusively for acoustic data are not necessary, and hence the structure may be reduced in size and simplified.

In the facsimile communication apparatus conforming to the invention, modulation/demodulation means for sending and receiving image data by using a telephone circuit is provided. This modulation/demodulation means is also equipped with memory means, and the image data memory region and acoustic data memory region are set by the memory control means, and the corresponding data are stored. At this time, the memory control means stores data by varying the image data memory region and acoustic data memory region depending on the quantity of each type of data.

Hence, when storing the acoustic data, the invention is effective in eliminating the necessity for installing a memory means for acoustic data which is separate from the memory means in which the image data is stored and which is disposed in the modulation/demodulation means, and therefore the structure may be means, and therefore the structure may be reduced in size and simplified. Meanwhile, the memory means of the invention is the means in which image data is stored, and such memory means is selected to have a far greater capacity than the memory means in which acoustic data is stored. By using such memory means, a huge quantity of acoustic data can be stored. Incidentally, in the memory means, the image data memory region and the acoustic data memory region can be dynamically assigned, and the memory processing depends on the state of use of the facsimile apparatus which can be realized.

In the facsimile communication apparatus according to the invention, the central control means detects that the predetermined acoustic data generation condition has been established. By this detection, the acoustic data is called out from the acoustic data memory region which is set in the program memory means, and is transferred to the modulation/demodulation means to be modulated and transmitted. Hence, an exclusive structure for storing the acoustic data is not needed, and the number of parts is reduced and the structure is downsized. The acoustic data is stored in the program memory means in which the program for defining the control action of the central control means is stored. Thus, control by the central control means in the acoustic data memory region is very easy, and complicated control, required for the such as continuous reproduction of. plural types of acoustic data may be done relatively easily.

BRIEF DESCRIPTION OF THE DRAWINGS

Other and further objects, features, and advantages of the invention will be more explicit from the following detailed description taken with reference to the drawings wherein:

FIG. 4 is a drawing for explaining the memory state of image memory 29;

FIG. 5 is a flow chart for explaining the operation of the above embodiment;

DETAILED DESCRIPTION OF THE PREFERRED EMBODIMENTS

Figure 1:
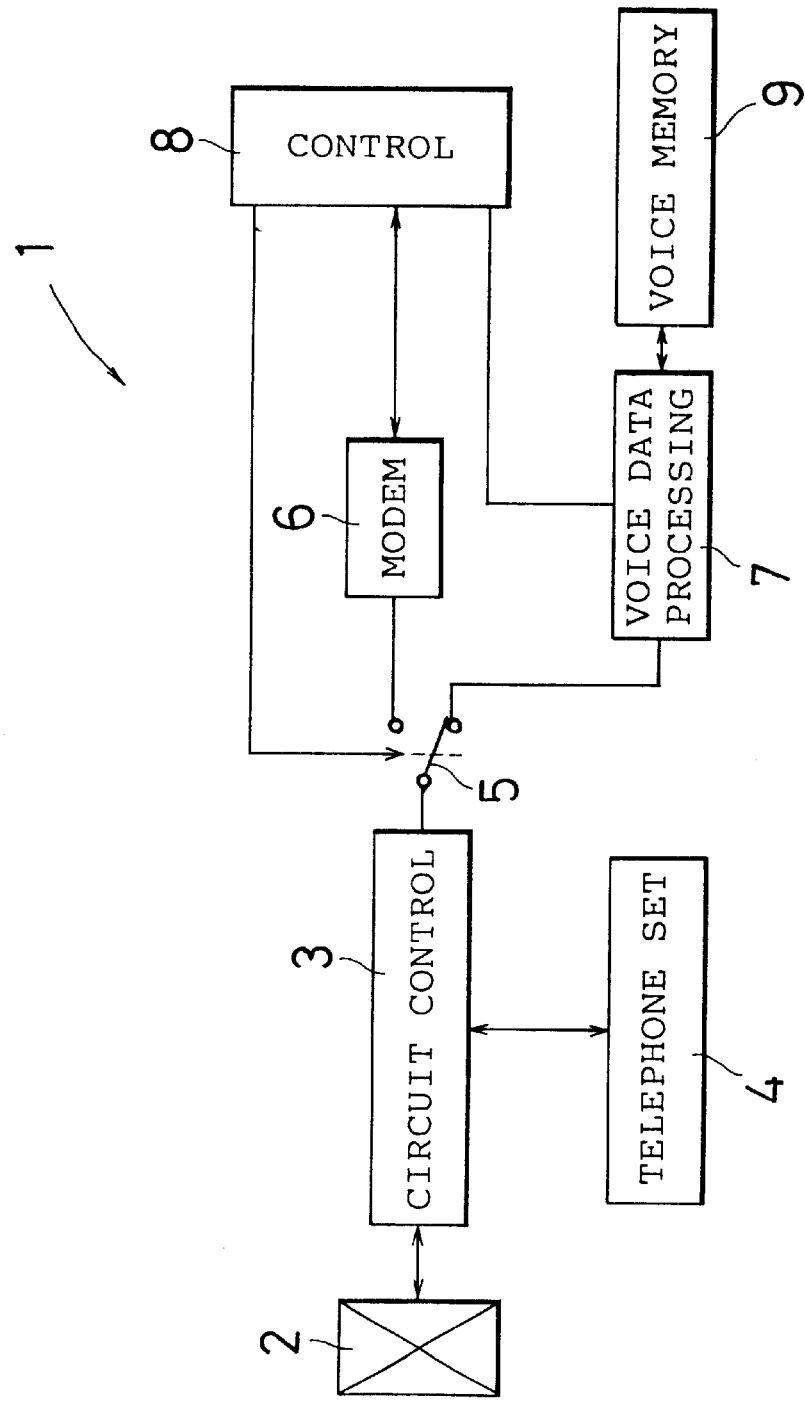
FIG. 1 is a block diagram of a typical conventional facsimile apparatus 1.

Now referring to the drawing, preferred embodiments of the invention are described below.

Figure 2:
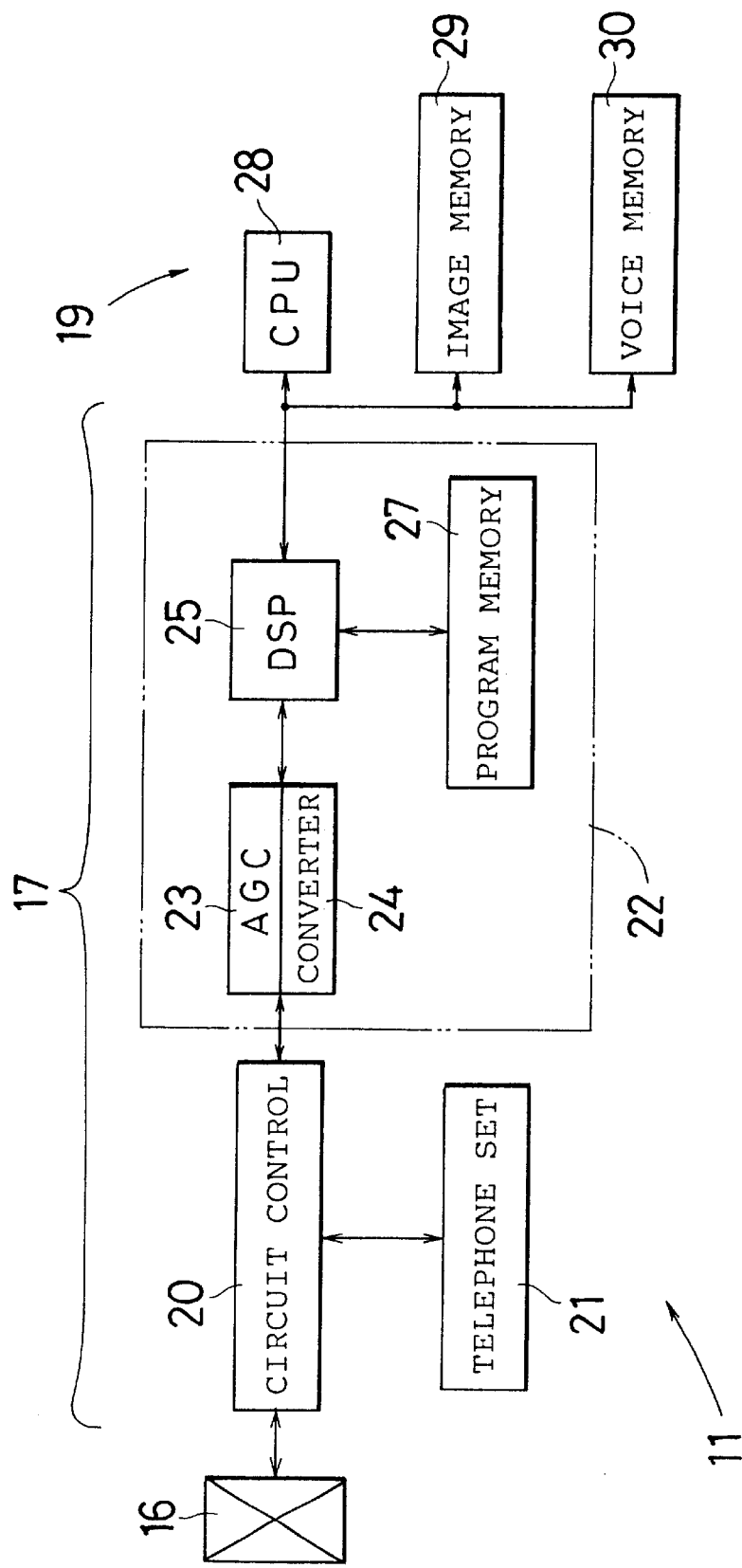
FIG. 2 is a block diagram showing a structural example of a facsimile apparatus 11 in an embodiment of the invention.
Figure 3:
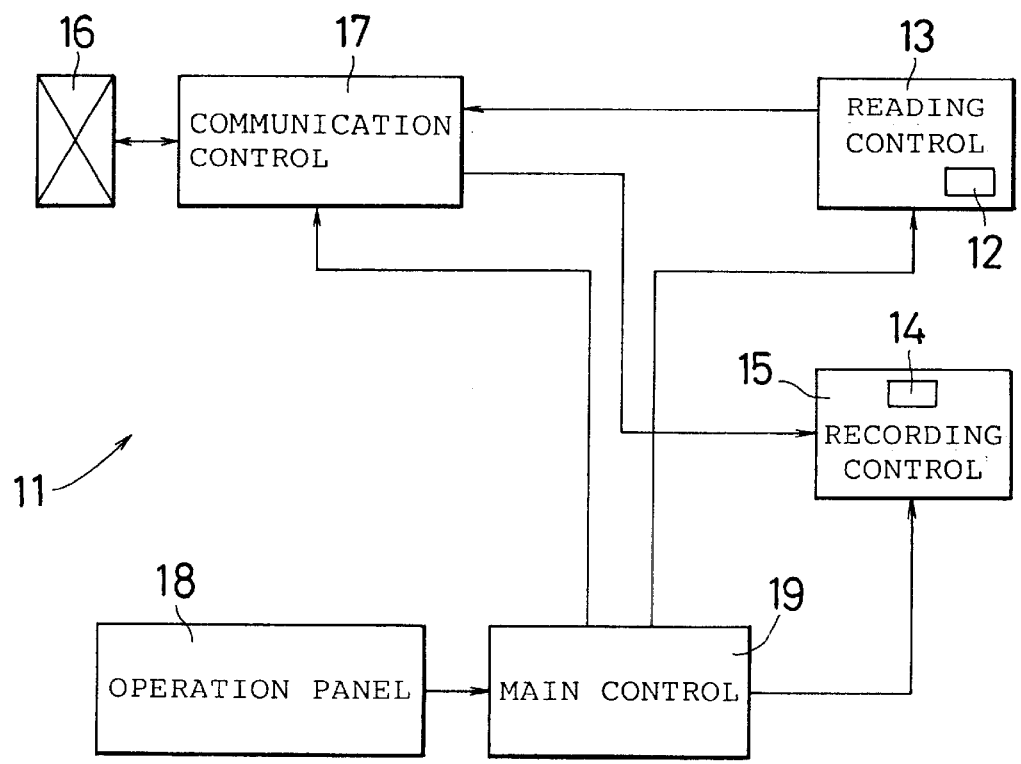
FIG. 3 is a block diagram showing the entire constitution of the facsimile apparatus 11.

FIG. 2 is a block diagram showing a structural example of a portion of a facsimile apparatus 11 of an embodiment of the invention, and FIG. 3 is a block diagram showing the entire structure of the facsimile apparatus 11. Referring to these drawings, the facsimile apparatus 11 comprises a circuit control part 20 for connecting the circuit with a telephone circuit network 16, for sending/receiving data, and for performing operations related with connection and disconnection of the circuit, and a telephone set 21 connected thereto.

A modem 22 is connected to the circuit control part 20. The modem 22 has an automatic gain control (AGC) circuit 23, and also comprises a converter 24 including, among others, an analog/digital converter for converting an analog signal from the circuit control part 20 into a digital signal and a digital/analog converter for converting a digital signal into an analog signal in the modem 22 and delivering the analog signal to the analog signal the circuit control part 20. The automatic gain control circuit 23 and converter 24 are connected to a digital signal processor (DSP) 25.

The DSP 25 is connected to a program memory 27 composed of, for example, a read-only memory (ROM) and other memory for storing a program for defining the action of the DSP 25. The above circuit control part 20, telephone set 21 and modem 22 are contained in a communication control part 17. A main control part 19 to which the communication control part 17 is connected contains, for example, a central control means 28 composed of microprocessor, an image memory 29 of a relatively large capacity composed of RAM and other memory for storing at least one of image data and voice data as mentioned below, and a voice memory 30 composed of ROM and other memory for storing, for example, plural types of voice data for use when sending voice data from the facsimile apparatus 11 as described later.

To the main control part 19, an operation panel 18 for feeding various control data and other dasta is connected, and also connected are a reading control part 13 containing reading means 12 composed of, for example, a charge coupled device (CCD) for optically reading the document to be transmitted, and a recording control part 15 containing a thermal head 14 for thermally recording the received image data.

FIG. 4 is a drawing for explaining the record state of the image memory 29, and FIG. 5 is a flowchart for explaining the operation of this embodiment. Referring also to these drawings, the operation of the embodiment is described below. At step a1 of FIG. 5, the facsimile apparatus 11 detects that a signal has arrived from the telephone circuit network 16. At step a2, it is judged if this signal is a facsimile receive request signal (CNG signal) or not. If affirmative, the processing advances to step a3, and the image data is received. At step a4, it is judged whether the present action mode of the facsimile apparatus 11 is the so-called memory receive mode or not. This memory receive mode, when set, is the action mode for storing the received image data, in the image memory 29, without having the image data printed out by the record control part 16.

If the judgement is negative at step a4, an ordinary reception for obtaining the print output using the thermal head 14 of the record control part 15 is executed. If affirmative at step a4, the operation advances to step a5, and it is judged if the memory region for recording the image data is preserved or not in the image memory 29 shown in FIG. 4. That is, in the image memory 29, for example, as shown in FIG. 4 (1), an image data memory region A2 and a voice data memory region A3 are set in the entire memory space A1 of the image memory 29. In the image data memory region A2, image data is stored from the minimum address up to the image data region Ad, and if not enough for the memory capacity of the image data memory region A2, a blank region Ae1 is left over. On the other hand, a blank region Ae2 is set from the minimum address of the voice data memory region A3, and after that the voice data is stored in the voice data region Aa.

When storing new voice data in the voice data memory region A3, the address in the voice data region Aa that is presently stored is decreased, and the voice data region Aa moves to the blank region Ae2. In the region vacated after moving of the voice data region Aa, new voice data is stored. Here, if the image data region Ad of the image data memory region A2 is relatively small, for example as shown in FIG. 4 (2), and the quantity of voice data to be newly stored is large, the boundary B of the image data memory region A2 and voice data memory region A3 is varied to contract the image data memory region A2 and expand the voice data memory region A3. To the contrary, when the voice data region Aa is relatively small and the quantity of image data to be stored is relatively large, a reverse processing is done.

In this way, the image data memory region A2 and voice data memory region A3 in the image memory 29 are dynamically changed in size, and the memory is controlled depending on the state of use of the facsimile apparatus 11.

When the memory regions are set in the image memory 29 in this procedure, it is judged affirmatively at step a5 to receive data.

If judged negatively at step a2, meanwhile, the operation skips to step a6, in which it is judged if the operating state of the facsimile apparatus 11 is in answering service mode or not. If judged negatively, the operation returns to step a3, and the processing as stated above is executed. If affirmatively judged at step a6, advancing to step a7, it is judged if there is any residual memory area in the voice data memory region A3 in the image memory 29. If judged negatively, returning to step a3, the same processing including moving of the boundary B in the image memory 29 is effected.

If judged affirmatively at step a7, advancing to step aS, the voice response mode is set. At step a9, the voice data entering from the telephone circuit network 16 is decoded by the modem 22, and is recorded in the image memory 29. At step a10, the voice coding mode for coding the voice data is set. At step all, the voice data such as "Enter code number" is read out from the voice memory 30, and is transferred to the random access memory (RAM) built in the modem 22 to be sent out to the telephone circuit network 16.

At step a12, it is judged if a predetermined specific time has passed or not after transmitting the voice response "Enter code number." If the time has passed, the communication circuit is cut off, and if the code number is received before the specific time has passed, the operation advances to step a13, and it is judged whether the code number matches with the identification code of the facsimile apparatus of the sender preliminarily stored in the facsimile apparatus 11. If not matched, the operation returns to step a9, and the same processing is repeated. If judged affirmatively at step a13, the operation returns to step a3 to repeat the same processing.

Thus, according to the embodiment, the voice data is stored in the image memory 29 in which the image data is stored and which is controlled by the CPU 28. As a result, as explained in relation to the prior art, a memory means used exclusively for voice data, and the related automatic gain control circuit, analog/digital converter, digital/analog converter, and coding processing circuit are not required, and the structure is much reduced in size and simplified. Besides, since the voice data is stored by using the image memory 29 with a relatively large capacity, if the voice is continuous for a relatively long time, it can be recorded and reproduced.

Moreover, even if either the image data or voice data is too much depending on the state of use of the facsimile apparatus 11, the image memory 29 may be utilized effectively, corresponding to such state of use. Besides, since the image memory 29 is controlled by the CPU 28, even if the data is recorded in plural cases, the reproduction may be executed in a desired sequence, and hence the ease of use is very much improved.

Figure 6:
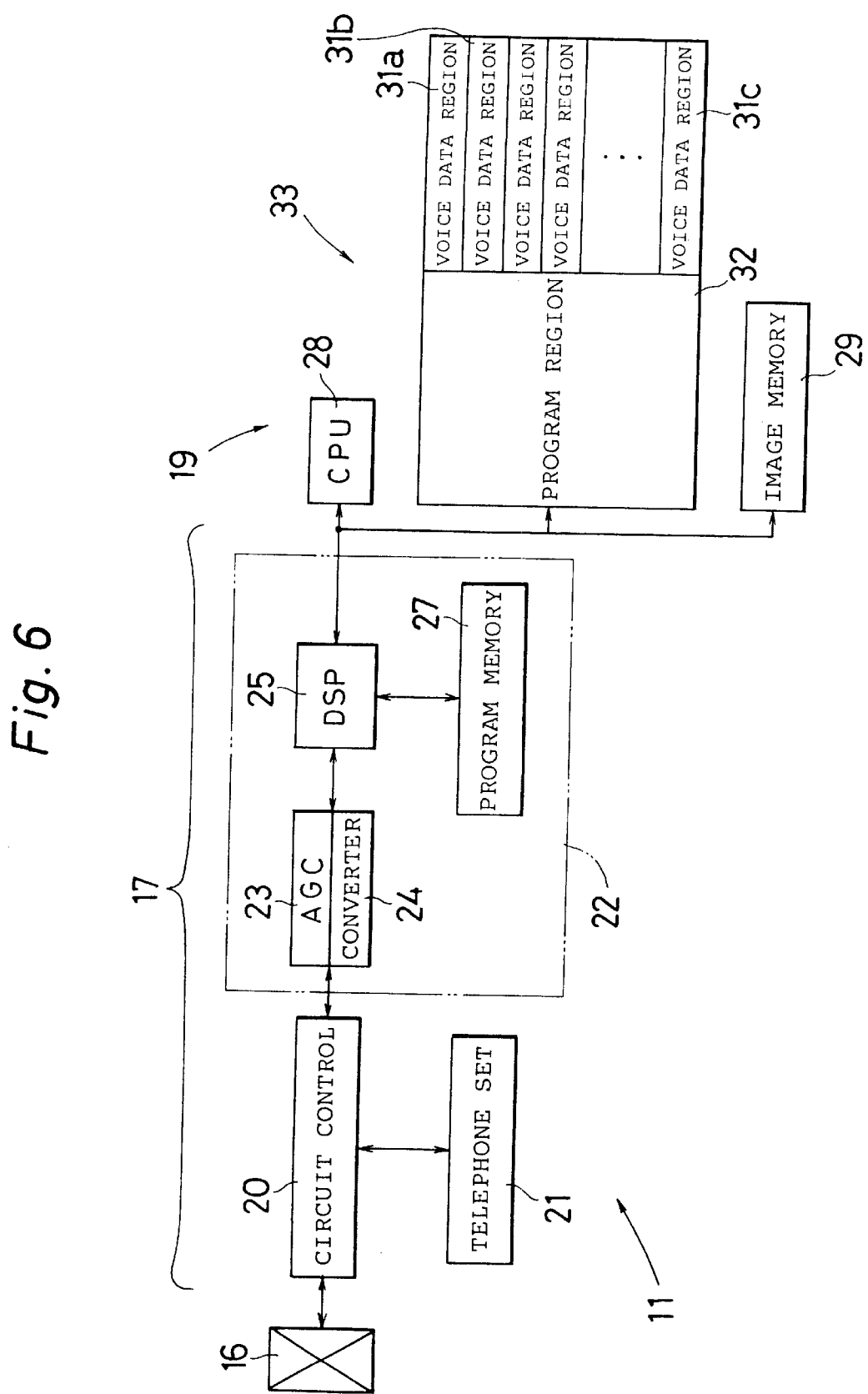
FIG. 6 is a block diagram showing a structural example of a facsimile apparatus in an other embodiment of the invention.

FIG. 6 is a block diagram of a facsimile communication apparatus 11a in an other embodiment of the invention.

A facsimile apparatus 11a comprises a circuit control part 20 for connecting the circuit with a telephone circuit network 16, sending/receiving data, and performing operations related with connection and disconnection of the circuit, and a telephone set 21 connected thereto.

A modem 22 is connected to the circuit control part 20. The modem 22 has an automatic gain control circuit 23, and also comprises a converter 24 including, among others, an analog/digital converter for converting the analog signal from the circuit control part 20 into a digital signal and a digital/analog converter for converting the digital signal into an analog signal in the modem 22 and delivering it to the circuit control part 20. The automatic gain control circuit 23 and converter 24 are connected to a digital signal processor (DSP) 25.

The DSP 25 includes a write register (not shown) for storing the logic state of a write flag WR to be used as stated below is set. To the DSP 25 is connected a program memory 27 composed of, for example, RAM and other memory for storing the program for defining the action of the DSP. The above circuit control part 20, telephone set 21 and modem 22 are included in a communication control part 17.

A main control part 19 to which the communication control part 17 is connected includes a central control means (CPU) 28 comprising, for example, a microprocessor, and a program memory 33 used as a program memory means composed of, for example, read only memory (ROM) for storing the program for defining the action of the central control means 28.

The program memory 33 includes a program region 32 for storing the program for defining the action of the central control means 28, and plural voice data regions 31a, 31b, . . . 31c for storing plural types of predetermined voice data such as "Enter code number."

As shown in FIG. 3, the main control part 19 is combined with an operation panel 18 for feeding various control data, and also comprises a reading control part 13 including reading means 12 composed of, for example, charge coupled device (CCD) for reading the document to be transmitted optically, a recording control part 14 including a thermal head 14 for thermally recording the received image data, and an image memory 29 (FIG. 6) for recording the image data related to transmission or reception.

Figure 7:
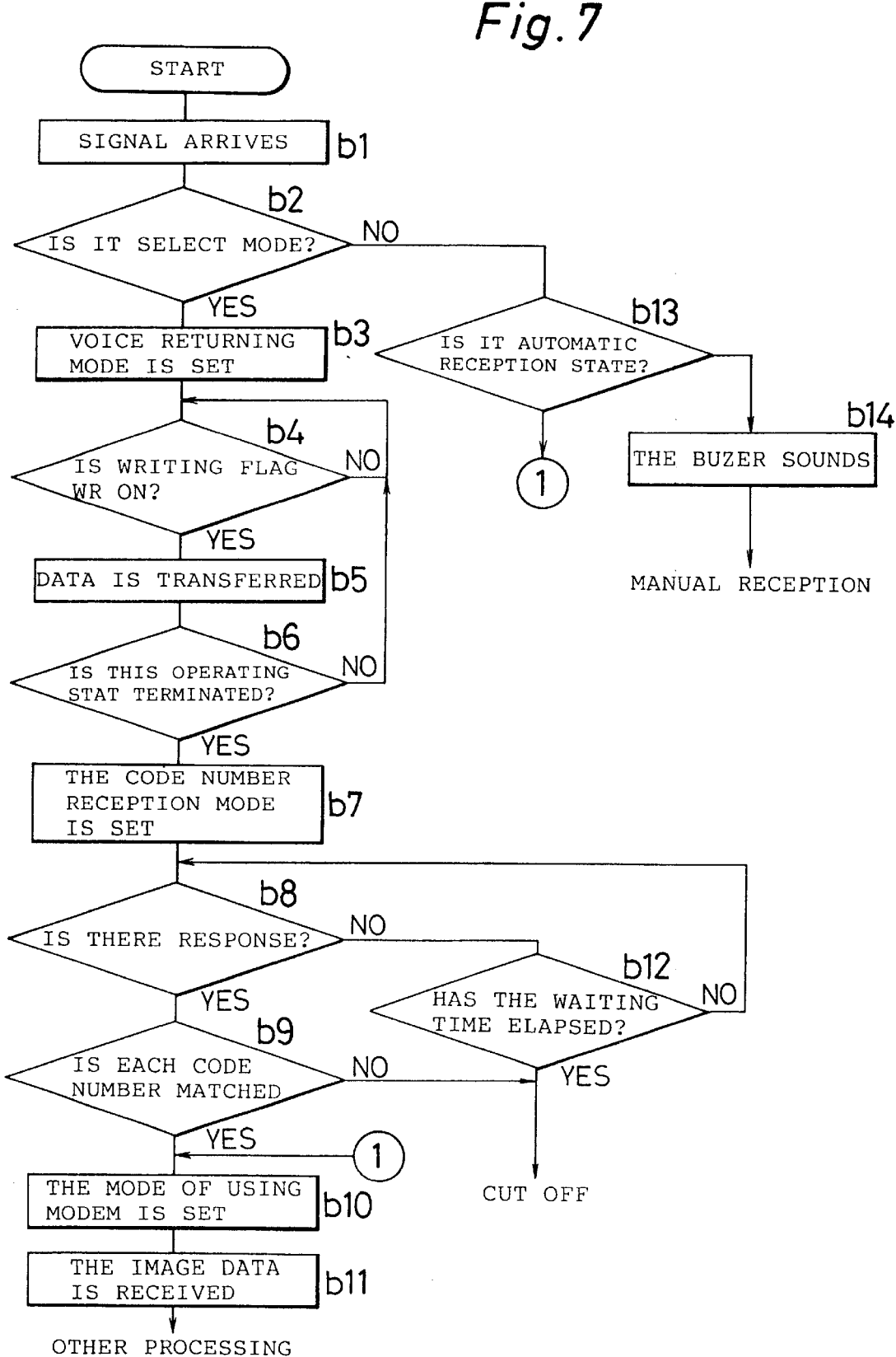
FIG. 7 is a flow chart for explaining the operation of the embodiment of FIG. 6.

FIG. 7 is a flowchart for explaining the operation of this embodiment. Referring also to FIG. 7, the operation of the embodiment is described below. At step b1 in FIG. 7, the facsimile apparatus 11a detects that a signal has arrived from other facsimile apparatus. At next step b2, the facsimile apparatus 11a judges, when receiving from an other facsimile apparatus, if it is in the operating state for start action, such as for automatic data reception for the first time after waiting for the input of a predetermined code number from the other facsimile apparatus after the circuit connection is established (this operating state is called the select mode hereinafter) or not.

If judged affirmatively, the operation moves to step b3, and the facsimile apparatus 11a of the reception side sets in the operating state for returning the voice data to the other facsimile apparatus. At step b4, the central control means 28 waits for the state of a writing flag WR to become "1" in the write register of the DSP 25. If this judgement is affirmative, the processing moves to step b5, and the central control means 28 specifies sequentially one or a plural pieces of plural voice data regions 31 in the program memory 33, and transfers the voice data to the modem 22.

At step b6, it is judged whether the voice data region 31 to be read out in this operating state has been terminated or not, and if not terminated the processing returns to step b4. That is, in this embodiment, depending on the operating procedure of the facsimile apparatus 11a, the plural voice data regions 31 may be read out in a corresponding sequence, and voice data having plural sentences may be transmitted to the other facsimile apparatus. In this embodiment, for example, the voice data "Please enter code number" is transmitted.

When judged affirmatively at step b6, the processing moves to step b7, and the facsimile apparatus 11a at the receiving side is set in the code number reception mode. At step b8, the presence or absence of a response from the facsimile apparatus at the transmission side is judged. If replied, moving to step b9, it is judged if the code number preliminarily stored in the facsimile apparatus 11a at the receiving side and the transmitted code number are matched. If matched, the facsimile apparatus 11a at the receiving side can receive data from the facsimile apparatus of the transmission side, and at step b10 the operation is set in the mode of using the modem 22 for image communication. At step b11, using the modem 22, the image data is received.

If judged negatively at step b8, advancing to step b12, it is judged if the predetermined waiting time has elapsed or not. If not elapsed, the processing returns to step b8, and if elapsed, the circuit with the facsimile apparatus at the transmission side is cut off. If judged negatively at step b9, too, the circuit is cut off.

If judged negatively at step 62, the processing moves to step b13, and it is judged if the operating state of the facsimile apparatus 11a at the receiving side is in the so-called automatic reception action state. If judged affirmatively, the processing moves to step b10, and the same processing is done, and the image data from the facsimile apparatus of the transmission side is received. If judged negatively at step b13, the operating state of the facsimile apparatus 11a is in manual reception state, and the processing moves to step b14, and a buzzer (not shown) or the like provided in the facsimile apparatus 11a sounds, thereby requesting an operator to change over manually from the telephone function to the facsimile function.

Thus, according to the embodiment, when generating voice data in the facsimile apparatus 11a, the memory means for storing the voice data is set in the program memory 33 for storing the program for defining the action of the central control means 28. Hence, it is not necessary to install memory means exclusively for voice data, and the number of parts is reduced, and the structure may be significantly reduced in size. Moreover, plural types of voice data may be stored in the program memory 33, and the individual voice data regions 31 may be controlled at high speed by the central control means 28, so that voice data for a relatively long sentence may be easily reproduced as mentioned above.

Conforming to the invention, when sending or receiving acoustic data by a facsimile communication apparatus, digital/analog conversion or analog/digital conversion may be effected by employing the modulation/demodulation means for processing the image data, and the data are coded or decoded by using the signal control means. As a result, memory means exclusively required for acoustic data and coding/decoding means and signal converting means are not required, and hence the structure may be reduced in size and simplified.

Thus, according to the invention, memory means is provided in the modulation/demodulation means for sending and receiving image data by using a telephone circuit, and an image data memory region and an acoustic data memory region are set by the memory control means, and the corresponding data are stored respectively. At this time, the memory control means is designed to store by varying the image data memory region and acoustic data memory region depending on the quantity of each type of data stored therein.

Accordingly, when storing the acoustic data, it is not necessary to install a memory means which is separate from the memory means in which the image data provided in the modulation/demodulation means is stored, and the structure is reduced in size and simplified. Further, the memory means of the invention is the means for storing the image data, and such memory means is selected to have far greater capacity than the memory means for storing acoustic data. By using such memory means, an abundant quantity of acoustic data can be stored. Moreover, in the memory means, the image data memory region and acoustic data memory region can be dynamically assigned, and the memory content depending on the state of use of the facsimile apparatus can be realized.

In this way, according to the invention, the acoustic data is called out from the acoustic data memory region set in the program memory means, and is transferred to the modulation/demodulation means to be modulated and transmitted. As a result, a memory exclusively for storing the acoustic data is not needed, and the number of parts is reduced, and the overall structure is reduced in size. Moreover, the acoustic data is stored in the program memory means for storing the program to defining the control action of the central control means. Hence, the control by the central control means of the acoustic memory region is by far easier, and complicated controls such as for the continuous reproduction of plural types of acoustic data may be done relatively easily.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A facsimile communicating apparatus comprising:
   means for sending and receiving voice data and image data to and from a telephone circuit,
   program memory comprising a program region for storing a voice data region for storing predetermined voice messages to be sent to the telephone circuit,
   single image memory comprising an image data memory region for storing image data and a voice data memory region for storing voice data being received from the sending and receiving means,
   a central control means,
   wherein said central control means is arranged to selectively vary a border between the image data memory region and the voice data memory region, and
   wherein the central control means is arranged so as to store image data by increasing addresses, and to store voice data by decreasing addresses.

2. A facsimile communication apparatus having means for sending and receiving image data to or from a telephone circuit, and for transmitting voice data to the telephone circuit, said apparatus comprising:
   a single modulating and demodulating means for modulating or demodulating both image data signals and voice data signals,
   central control means,
   single image memory comprising an image data memory region for storing image data and a voice data memory region for storing voice data being received from the sending and receiving means,
   program memory comprising a program region for storing a program for defining the operation of the central control means and a voice data region for storing a predetermined voice message to be sent to the circuit,
   wherein the central control means detects that a condition for sending said predetermined voice message is established, reads out the predetermined voice message from the voice data region of the program memory, and transfers the predetermined voice message to the modulating/demodulating means for modulation and sending to the telephone circuit,
   wherein the central control means is arranged to selectively vary a border between the image data memory region and the voice data memory region, and
   wherein the central control means is arranged so as to store image data by increasing addresses, and to store voice data by decreasing addresses.

3. A facsimile communication apparatus comprising:
   means for sending and receiving voice data and image data to and from the telephone circuit, said means including
   signal converting means for converting an analog signal supplied from the telephone circuit into a digital signal and for converting a digital signal supplied from said facsimile apparatus into an analog signal supplied to the telephone circuit;
   signal controlling means for coding or decoding a digital signal supplied to or from the signal converting means, respectively,
   document reading means for providing image data from a document to be transmitted to another facsimile apparatus;
   single image memory comprising an image data memory region for storing image data and a voice data memory region for storing voice data received or to be sent, respectively, by said apparatus;
   a single common modulating and demodulating means for modulating or demodulating both image data signals and voice data signals;
   program memory comprising a voice data region for storing voice data representing a predetermined message to be transmitted by said apparatus to said telephone circuit;
   a central control means;
   wherein said central control means is arranged to selectively vary a border between the image data memory region and the voice data memory region; and
   wherein said central control means is arranged so as to store image data by increasing addresses, and to store voice data by decreasing addresses.

4. A facsimile communicating apparatus in accordance with claim 3, said apparatus further including:
   means for varying the size of said image data memory region and the size of said voice data memory region of said single image memory, depending on the quantities of the image data and the voice data stored therein.

5. A facsimile communication apparatus according to claim 1, wherein:
   said central control means contracts the image data memory region and expands the voice data memory region by selectively vary the border between the image data memory region and the voice data memory region when it is determined that the quantity of voice data to be newly added is larger than a present capacity of said voice data memory and it is determined that the quantity of image data in said image data memory region is smaller than a present capacity of said image data memory region; and
   said central control means contracts the voice data memory region and expands the image data memory region by selectively vary the border between the image data memory region and the voice data memory region when it is determined that the quantity of image data to be newly added is larger than a present capacity of said image data memory and it is determined that the quantity of voice data in said voice data memory region is smaller than a present capacity of said voice data memory region.

6. A facsimile communication apparatus according to claim 2, wherein:
   said central control means contracts the image data memory region and expands the voice data memory region by selectively vary the border between the image data memory region and the voice data memory region when it is determined that the quantity of voice data to be newly added is larger than a present capacity of said voice data memory and it is determined that the quantity of image data in said image data memory region is smaller than a present capacity of said image data memory region; and
   said central control means contracts the voice data memory region and expands the image data memory region by selectively vary the border between the image data memory region and the voice data memory region when it is determined that the quantity of image data to be newly added is larger than a present capacity of said image data memory and it is determined that the quantity of voice data in said voice data memory region is smaller than a present capacity of said voice data memory region.

7. A facsimile communication apparatus according to claim 3, wherein:

said central control means contracts the image data memory region and expands the voice data memory region by selectively vary the border between the image data memory region and the voice data memory region when it is determined that the quantity of voice data to be newly added is larger than a present capacity of said voice data memory and it is determined that the quantity of image data in said image data memory region is smaller than a present capacity of said image data memory region; and said central control means contracts the voice data memory region and expands the image data memory region by selectively vary the border between the image data memory region and the voice data memory region when it is determined that the quantity of image data to be newly added is larger than a present capacity of said image data memory and it is determined that the quantity of voice data in said voice data memory region is smaller than a present capacity of said voice data memory region.

* * * * *